(12) United States Patent
Berkner-Cieslicki et al.

(10) Patent No.: US 11,829,528 B2
(45) Date of Patent: *Nov. 28, 2023

(54) EYE TRACKING SYSTEM

(71) Applicant: Apple Inc., Cupertino, CA (US)

(72) Inventors: Kathrin Berkner-Cieslicki, Los Altos, CA (US); Se Baek Oh, Cupertino, CA (US); Scott M. DeLapp, Cupertino, CA (US); Christopher F. Griffo, Cupertino, CA (US); Bradley C. Steele, Cupertino, CA (US); Ting Sun, Cupertino, CA (US); Kenichi Saito, Cupertino, CA (US); Noah D. Bedard, Pacifica, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/718,083

(22) Filed: Apr. 11, 2022

(65) Prior Publication Data

US 2022/0236799 A1 Jul. 28, 2022

Related U.S. Application Data

(63) Continuation of application No. 16/984,040, filed on Aug. 3, 2020, now Pat. No. 11,360,557.

(60) Provisional application No. 62/883,553, filed on Aug. 6, 2019.

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/0172* (2013.01); *G02B 2027/014* (2013.01); *G02B 2027/0138* (2013.01); *G02B 2027/0174* (2013.01); *G02B 2027/0187* (2013.01)

(58) Field of Classification Search
CPC ...... G02B 2027/0138; G02B 2027/014; G02B 2027/0174; G02B 2027/0187; G02B 27/0093; G02B 27/0172; G02B 27/1086; G02B 5/1814; G06F 3/011; G06F 3/013
See application file for complete search history.

(56) References Cited

U.S. PATENT DOCUMENTS

| 9,377,623 | B2 | 6/2016 | Robbins et al. |
| 10,598,928 | B1 | 3/2020 | Lam et al. |
| 10,845,594 | B1 | 11/2020 | Lam et al. |
| 11,360,557 | B2 * | 6/2022 | Berkner-Cieslicki ....... G02B 27/0172 |
| 2010/0060551 | A1 | 3/2010 | Sugiyama et al. |
| 2013/0016413 | A1 | 1/2013 | Saeedi et al. |

(Continued)

*Primary Examiner* — Dmitriy Bolotin
(74) *Attorney, Agent, or Firm* — Robert C. Kowert; Kowert, Hood, Munyon, Rankin & Goetzel, P.C.

(57) ABSTRACT

An eye tracking system for detecting position and movements of a user's eyes in a head-mounted display (HMD). The eye tracking system includes at least one eye tracking camera, an illumination source that emits infrared light towards the user's eyes, and diffraction gratings located at the eyepieces. The diffraction gratings redirect or reflect at least a portion of infrared light reflected off the user's eyes, while allowing visible light to pass. The cameras capture images of the user's eyes from the infrared light that is redirected or reflected by the diffraction gratings.

19 Claims, 15 Drawing Sheets

(56) References Cited

U.S. PATENT DOCUMENTS

| | | |
|---|---|---|
| 2014/0354952 A1 | 12/2014 | Verly et al. |
| 2017/0176755 A1 | 6/2017 | Cai et al. |
| 2018/0157909 A1 | 6/2018 | Ollila et al. |
| 2018/0157910 A1 | 6/2018 | Ollila et al. |
| 2018/0275409 A1 | 9/2018 | Gao et al. |

* cited by examiner

EYE TRACKING SYSTEM

PRIORITY INFORMATION

This application is a continuation of U.S. patent application Ser. No. 16/984,040, filed Aug. 3, 2020, which claims benefit of priority of U.S. Provisional Application Ser. No. 62/883,553 entitled "EYE TRACKING SYSTEM" filed Aug. 6, 2019, which are incorporated by reference herein in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

An eye tracker is a device for estimating eye positions and eye movement. Eye tracking systems have been used in research on the visual system, in psychology, psycholinguistics, marketing, and as input devices for human-computer interaction. In the latter application, typically the intersection of a person's point of gaze with a desktop monitor is considered.

SUMMARY

Various embodiments of methods and apparatus for eye tracking in virtual and mixed or augmented reality (VR/AR) applications are described. A VR/AR device such as a headset, helmet, goggles, or glasses (referred to herein as a head-mounted display (HMD)) is described that includes a display (e.g., left and right display panels) for displaying frames including left and right images in front of a user's eyes to thus provide 3D virtual views to the user. The HMD may include left and right eyepieces located between the display and the user's eyes, each eyepiece including one or more optical lenses. The eyepieces form a virtual image of the displayed content at a design distance which is typically close to optical infinity of the eyepieces.

The HMD may include an eye tracking system for detecting position and movements of the user's eyes. The eye tracking system may include at least one eye tracking camera (e.g., infrared (IR) cameras) pointed towards surfaces of the respective eyepieces, an illumination source (e.g., an IR light source) that emits light (e.g., IR light) towards the user's eyes, and transmissive or reflective diffraction gratings integrated in the eyepieces. The diffraction gratings may, for example, be a holographic layer or film sandwiched between two optical lenses in the eyepieces, or alternatively a holographic layer or film laminated to an image side (eye-facing) or object side (display-facing) surface of an optical lens in the eyepieces.

In some embodiments, the light sources of the HMD emit IR light to illuminate the user's eyes. A portion of the IR light is reflected off the user's eyes to the eye-facing surfaces of the eyepieces of the HMD. The diffraction gratings integrated in the eyepieces are configured to redirect (transmissive gratings) or reflect (reflective gratings) at least a portion of the IR light received at the eyepieces towards the IR cameras, while allowing visible light to pass. The IR cameras, which may be located at or near edges of the display panels when using transmissive gratings or alternatively at the sides of the user's face (e.g., at or near the user's cheek bones) when using reflective gratings, capture images of the user's eyes from the infrared light reflected or redirected by the diffraction gratings.

Integrating transmissive or reflective diffraction gratings in the eyepieces allows the spacing between the eyepieces and the display panels to be reduced when compared to systems that include hot mirrors located between the eyepieces and the display panels that reflect IR light towards the IR cameras. Integrating reflective gratings in the eyepieces allows the user's eyes to be imaged through the eyepieces while improving the images (e.g., by reducing distortion) captured by the IR cameras when compared to systems in which the IR cameras view the user's eyes directly through the eyepieces. Integrating transmissive or reflective gratings in the eyepieces also improves the viewing angle of the IR cameras when compared to systems in which the IR cameras view the user's eyes directly through the eyepieces, allowing the IR cameras to image the user's pupils when turned away from the cameras. Integrating reflective gratings in the eyepieces allows the eye tracking cameras to be placed at the sides of the user's face (e.g., at or near the user's cheek bones) without having to image through the eyepieces.

Images captured by the eye tracking system may be analyzed to detect position and movements of the user's eyes, or to detect other information about the eyes such as pupil dilation. For example, the point of gaze on the display estimated from the eye tracking images may enable gaze-based interaction with content shown on the near-eye display of the HMD. Other applications may include, but are not limited to, creation of eye image animations used for avatars in a VR/AR environment.

Figure 1A:
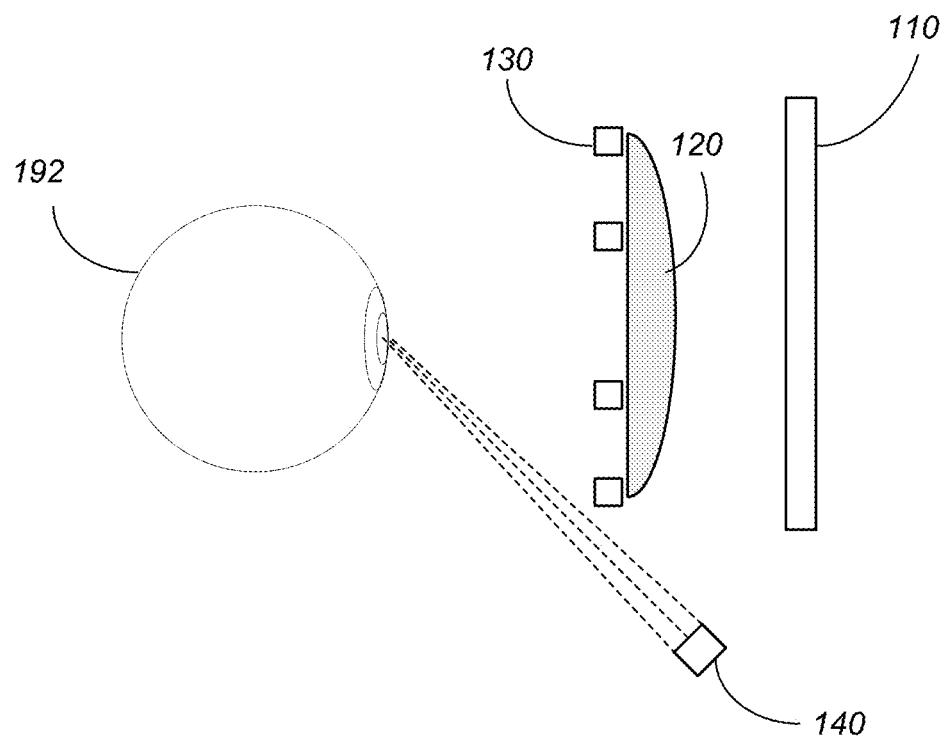
FIGS. 1A through 1C illustrate eye tracking systems for VR/AR head-mounted displays (HMDs).

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for eye tracking in virtual and mixed or augmented reality (VR/AR) applications are described. A VR/AR device such as a headset, helmet, goggles, or glasses (referred to herein as a head-mounted display (HMD)) is described that includes a display (e.g., left and right displays) for displaying frames including left and right images in front of a user's eyes to thus provide 3D virtual views to the user. The HMD may include left and right optical lenses (referred to herein as eyepieces) located between the display and the user's eyes. The eyepieces form a virtual image of the displayed content at a design distance which is typically close to optical infinity of the eyepieces. The HMD may include an eye tracking system (which may also be referred to as a gaze tracking system) for detecting position and movements of the user's eyes, or for detecting other information about the eyes such as pupil dilation. The point of gaze on the display estimated from the information captured by the eye tracking system may, for example, allow gaze-based interaction with the content shown on the near-eye display. Other applications may include, but are not limited to, creation of eye image animations used for avatars in a VR/AR environment.

Embodiments of an eye tracking system for HMDs are described that include at least one eye tracking camera (e.g., infrared (IR) cameras) pointed towards the surfaces of the respective eyepieces, an illumination source (e.g., an IR light source) that emits light (e.g., IR light) towards the user's eyes, and transmissive or reflective diffraction gratings integrated in the eyepieces (e.g., as holographic film). The diffraction gratings redirect or reflect light in the infrared range while allowing visible light to pass.

In some embodiments, the diffraction grating may be implemented as a holographic film or layer sandwiched between two optical lenses of an eyepiece, or applied to an object-side or image-side surface of an eyepiece. In some embodiments, the holographic layer may be applied to a surface of one optical lens, and then the second optical lens may be attached to the holographic layer, for example using an optical coupling liquid. In some embodiments, the surfaces of the lenses between which the holographic layer is sandwiched may be planar. However, in some embodiments, the surfaces may be curved. Note that other types of diffraction gratings may be used in some embodiments. For example, in some embodiments, a photothermal reflective glass may be used as the diffraction grating. In other embodiments, a surface relief grating with mismatched index of refraction at the eye tracking wavelength may be used as the diffraction grating.

In some embodiments, the light sources of the HMD emit IR light to illuminate the user's eyes. A portion of the IR light is reflected off the user's eyes to the eye-facing surfaces of the eyepieces of the HMD. The holographic layers integrated in the eyepieces are configured to redirect (transmissive gratings) or reflect (reflective gratings) at least a portion of the IR light received at the eyepieces towards the IR cameras, while allowing visible light to pass. The IR cameras, which may be located at or near edges of the display panels when using transmissive gratings or alternatively at the sides of the user's face (e.g., at or near the user's cheek bones) when using reflective gratings, capture images of the user's eyes from the infrared light reflected or redirected by the holographic layers.

Integrating transmissive or reflective gratings in the eyepieces improves the viewing angle of the IR cameras when compared to systems in which the IR cameras view the user's eyes directly through the eyepieces, allowing the IR cameras to image the user's pupils when turned away from the cameras. Integrating transmissive or reflective diffraction gratings in the eyepieces allows the spacing between the eyepieces and the display panels to be reduced when compared to systems that include hot mirrors located between the eyepieces and the display panels that reflect IR light towards the IR cameras. Integrating reflective gratings in the eyepieces allows the user's eyes to be imaged through the eyepieces while improving the images (e.g., by reducing distortion) captured by the IR cameras when compared to systems in which the IR cameras view the user's eyes directly through the eyepieces. Integrating reflective gratings in the eyepieces allows the eye tracking cameras to be placed at the sides of the user's face (e.g., at or near the user's cheek bones) without having to image through the eyepieces.

Images captured by the eye tracking system may be analyzed to detect position and movements of the user's eyes, or to detect other information about the eyes such as pupil dilation. For example, the point of gaze on the display estimated from the eye tracking images may enable gaze-based interaction with content shown on the near-eye display of the HMD. Other applications may include, but are not limited to, creation of eye image animations used for avatars in a VR/AR environment.

While embodiments of an eye tracking system for HMDs are generally described herein as including at least one eye tracking camera positioned at each side of the user's face to track the gaze of both of the user's eyes, an eye tracking system for HMDs may also be implemented that includes at least one eye tracking camera positioned at only one side of the user's face to track the gaze of only one of the user's eyes.

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented Reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Eye Tracking System

Figure 1B:
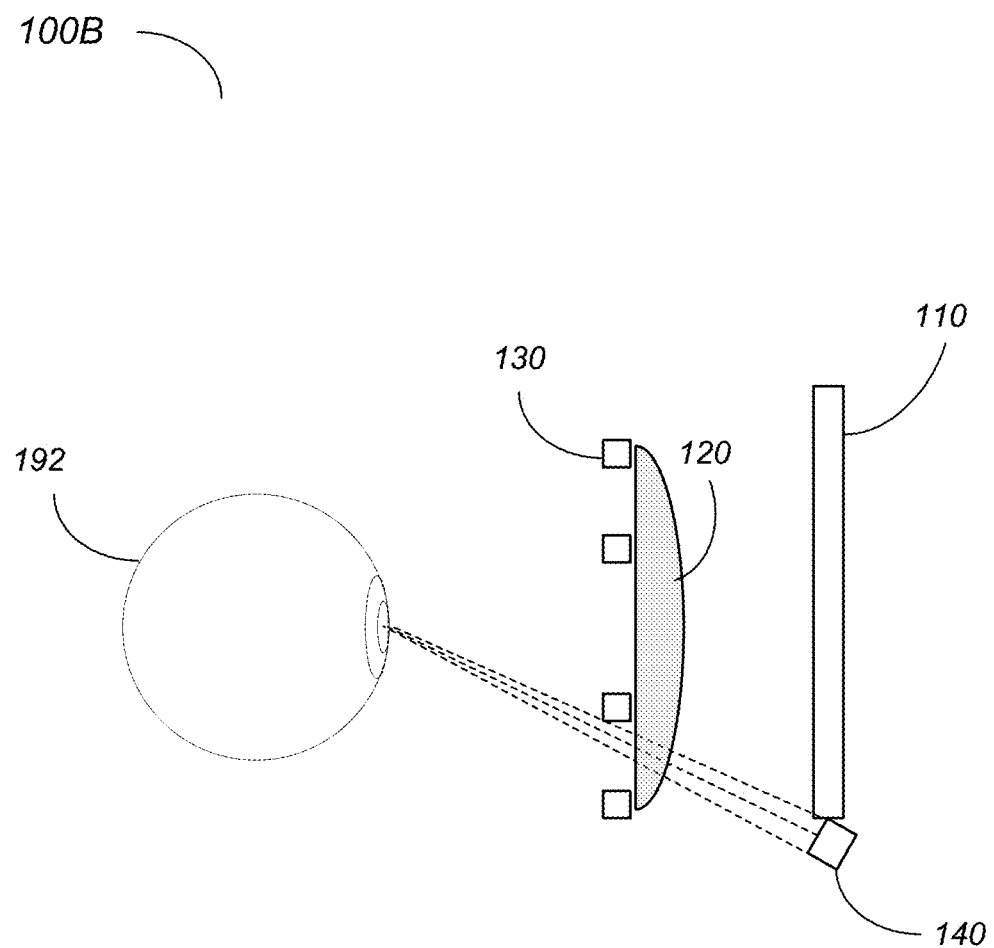
Figure 1C:
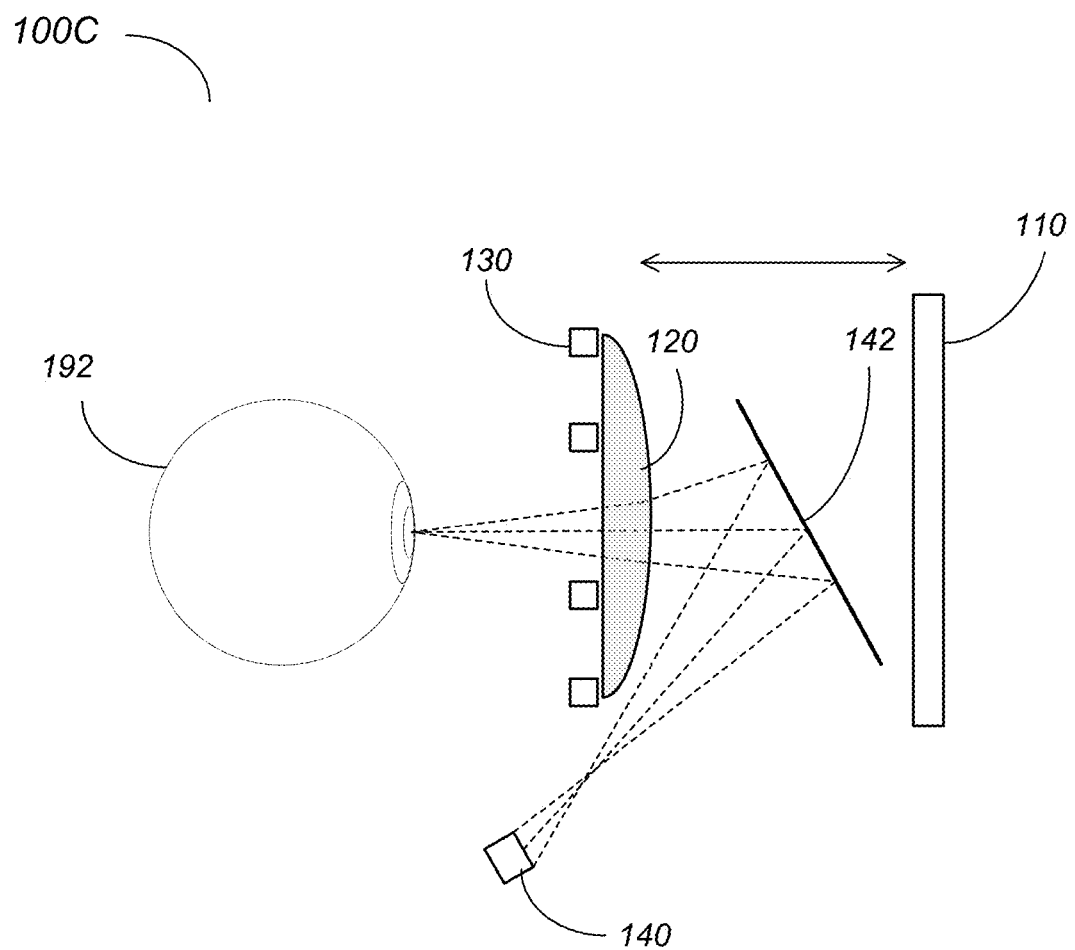

FIGS. 1A through 1C illustrate eye tracking systems for VR/AR HMDs. A VR/AR HMD 100 may include a display 110 and two eyepiece lenses 120, mounted in a wearable housing. Infrared (IR) light source(s) 130 may be positioned in the HMD 100 (e.g., around the eyepieces 120, or elsewhere in the HMD 100) to illuminate the user's eyes 192 with IR light. The user looks through the eyepieces 120 onto the display 110. The eyepieces 120 form a virtual image of the displayed content at a design distance which is typically close to optical infinity of the eyepieces 120. Eye tracking cameras 140 may be positioned in the HMD 100 to capture views of the user's eyes 192. To fit the eye tracking cameras 140 in the HMD 100 while keeping the cameras 140 out of sight of the user, different camera optical paths have been used.

Referring to HMD 100A of FIG. 1A, the cameras 140 are positioned to have a direct view of the user's eyes. Referring to HMD 100B of FIG. 1B, the cameras 140 are positioned nearer to the display 110 such that a frontal view of the eyes 192 is captured through the eyepieces 120. Referring to HMD 100C of FIG. 1C, hot mirrors 142 are positioned between the eyepieces 120 and the display 110 to fold the camera 140 optical paths away from the visible light display 110 optical paths; the cameras 140 may be positioned near the user's cheek bones and facing the hot mirrors 142.

The camera optical paths shown in FIGS. 1A through 1C have advantages and disadvantages. The direct view of FIG. 1A does not pass through the eyepiece, but may look onto the eye from a tilted position which may cause reduced detection accuracy of eye features at extreme gaze angles due to distortion, insufficient depth-of-field, and occlusions. The through-the-eyepiece view of FIG. 1B allows a more centered view of the eye than the direct view of FIG. 1A, but has to deal with distortions in the eye images introduced by the eyepiece. In addition, while the through-the-eyepiece view of FIG. 1B improves the viewing angle somewhat when compared to the direct view of FIG. 1A, this configuration still suffers from reduced detection accuracy of eye features at extreme gaze angles. Using hot mirrors 142 as shown in FIG. 1C may provide a centered view of the eyes, and thus significantly improves detection accuracy of eye features at extreme gaze angles. However, the hot mirrors 142 require increased spacing between the eyepieces 120 and the display 110.

Figure 2A:
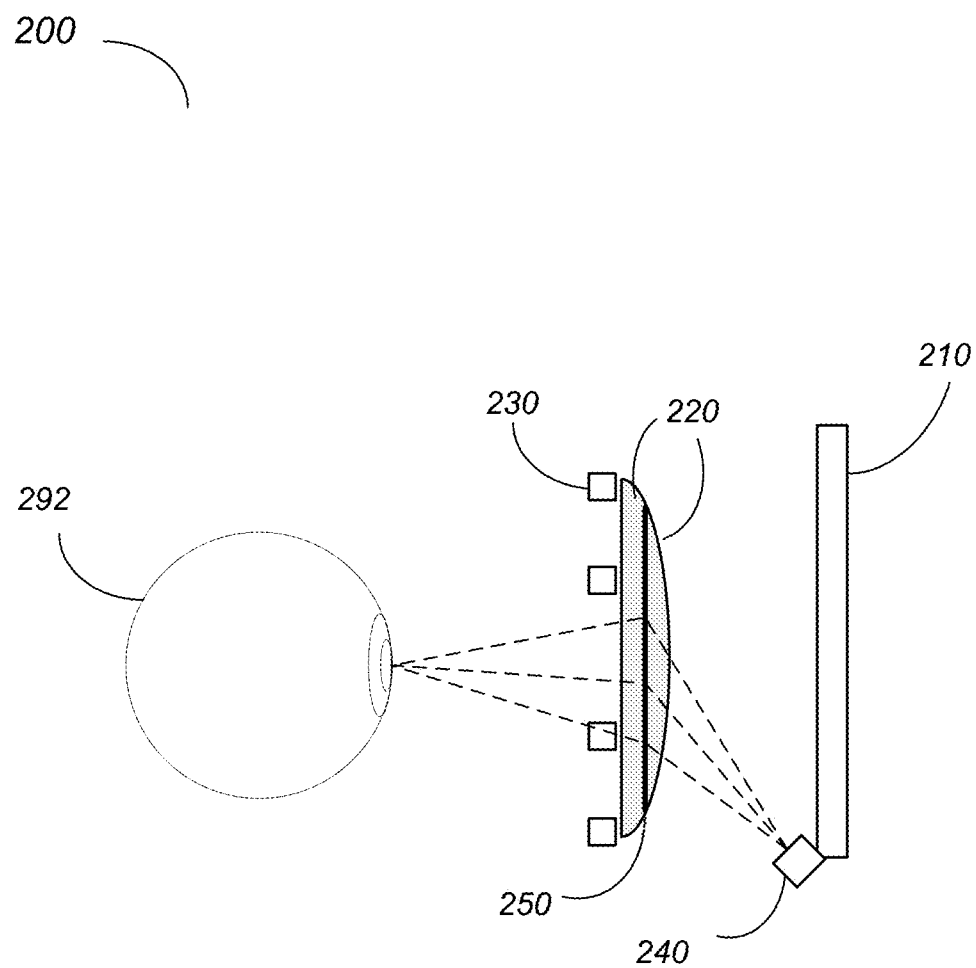
FIGS. 2A and 2B illustrate a VR/AR HMD that implements an eye tracking system that includes transmissive diffraction gratings in the eyepieces, according to some embodiments.
Figure 2B:
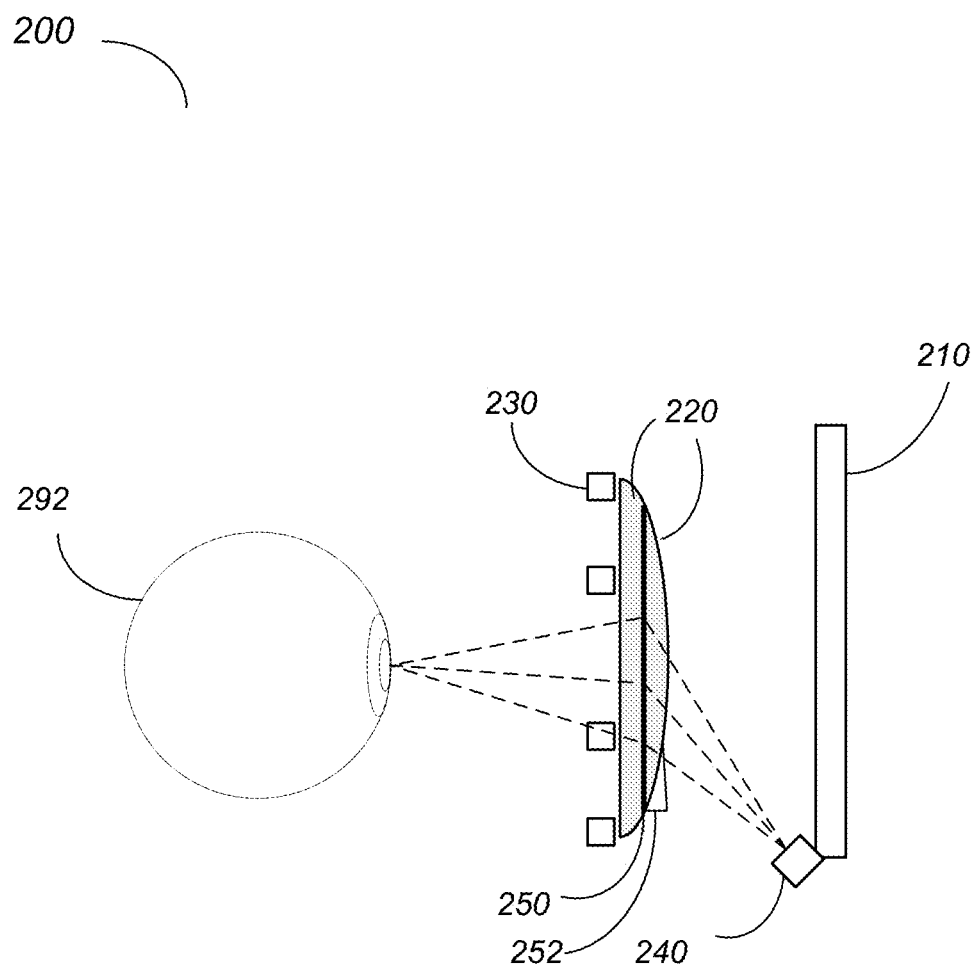
Figure 3:
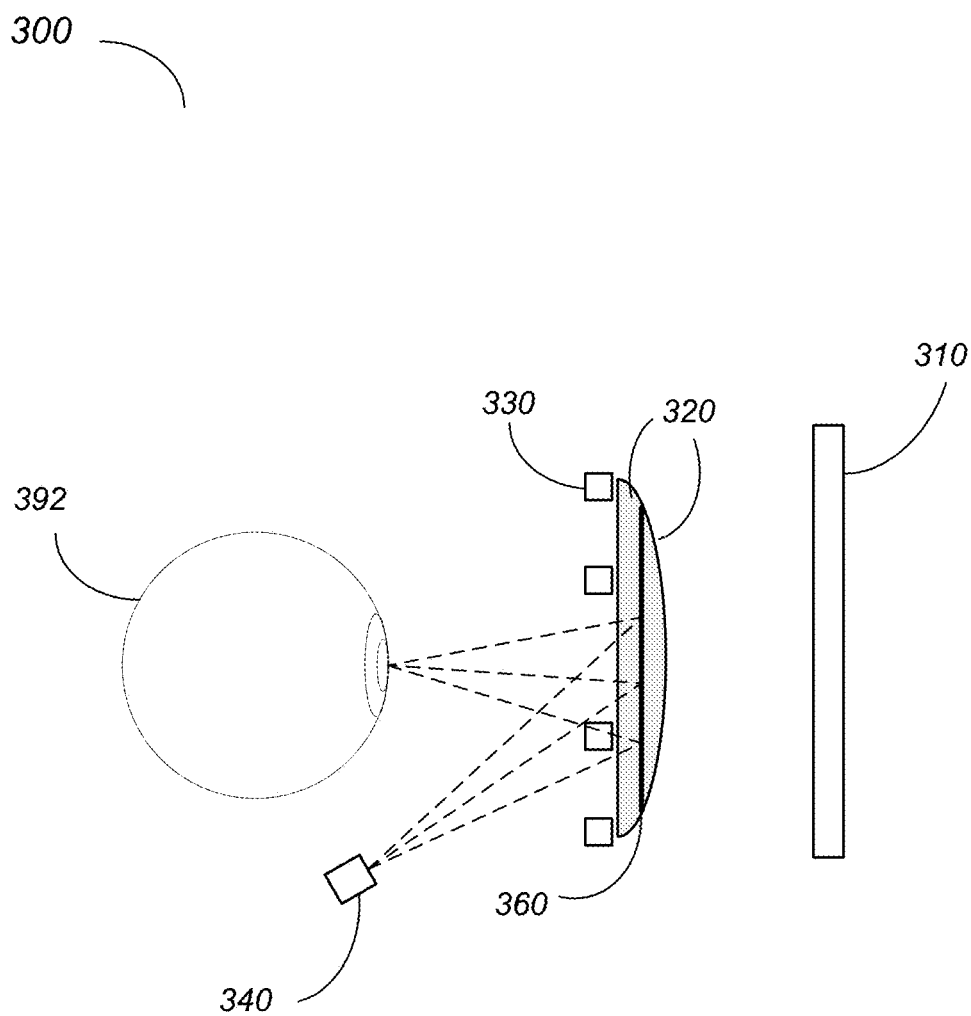
FIG. 3 illustrates a VR/AR HMD that implements an eye tracking system that includes reflective diffraction gratings in the eyepieces, according to some embodiments.

FIGS. 2A, 2B, and 3 illustrate embodiments of eye tracking system for VR/AR HMDs that include diffraction gratings in the eyepieces of the HMDs. FIGS. 2A and 2B illustrate a VR/AR HMD 200 that implements an eye tracking system that includes transmissive diffraction gratings in the eyepieces, according to some embodiments. FIG. 3 illustrates a VR/AR HMD 300 that implements an eye tracking system that includes reflective diffraction gratings in the eyepieces, according to some embodiments. Integrating transmissive or reflective gratings in the eyepieces improves the viewing angle of the IR cameras when compared to systems in which the IR cameras view the user's eyes directly as shown in FIG. 1A or through the eyepieces as shown in FIG. 1B, allowing the IR cameras to image the user's pupils when turned away from the cameras. Integrating transmissive or reflective diffraction gratings in the eyepieces allows the spacing between the eyepieces and the display panels to be reduced when compared to systems as shown in FIG. 1C that include hot mirrors located between the eyepieces and the display panels that reflect IR light towards the IR cameras. Integrating reflective gratings in the eyepieces as shown in FIG. 3 allows the user's eyes to be imaged through the eyepieces while improving the images (e.g., by reducing distortion) captured by the IR cameras when compared to systems in which the IR cameras view the user's eyes directly through the eyepieces, as shown in FIG. 1B. Integrating reflective gratings in the eyepieces as shown in FIG. 3 allows the eye tracking cameras to be placed at the sides of the user's face (e.g., at or near the user's cheek bones) without having to image through the eyepieces.

FIG. 2A illustrates a VR/AR HMD 200 that implements an eye tracking system that includes transmissive diffraction gratings in the eyepieces, according to some embodiments. VR/AR HMD 200 may include, but is not limited to, a display 210 and two eyepieces 220, mounted in a wearable housing or frame. Each eyepiece 220 is an optical system that may include one or more optical lenses. The eye tracking system includes transmissive diffraction gratings 250 in the eyepieces 220, and at least one eye tracking camera 240 (e.g., infrared (IR) cameras) located at or near an edge of the display 210 (e.g., at the top, bottom, left, and/or right side of the display 210). The user looks through the eyepieces 220 onto the display 210. The eyepieces 220 form a virtual image of the displayed content at a design distance which is typically close to optical infinity of the eyepieces 220. The eye tracking system may, for example, be used to track position and movement of the user's eyes 292. In some embodiments, the eye tracking system may instead or also be used to track dilation of the user's pupils, or other characteristics of the user's eyes 292. IR light source(s) 230 (e.g., IR LEDs) may be positioned in the HMD 200 (e.g., around the eyepieces 220, or elsewhere in the HMD 200) to illuminate the user's eyes 292 with IR light. In some embodiments, the display 210 emits light in the visible light range and does not emit light in the IR range, and thus does not introduce noise in the eye tracking system.

The transmissive diffraction gratings 250 are positioned at or within the eyepieces 220. In some embodiments, a transmissive diffraction grating 250 may be implemented as a holographic layer 250 sandwiched between two optical lenses of an eyepiece 220, or as a holographic layer attached to an object-side or image-side surface of an eyepiece 220. In some embodiments, the holographic layer 250 may be applied to a surface of one optical lens, and then the second optical lens may be attached to the holographic layer 250, for example using an optical coupling liquid. The surfaces of the lenses between which the holographic layer 250 is sandwiched may be, but are not necessarily, planar.

The light sources 230 of the HMD 200 emit IR light to illuminate the user's eyes 292. A portion of the IR light is reflected off the user's eyes 292 to the eye-facing surfaces of the eyepieces 220 of the HMD 200. The transmissive holographic layers 250 integrated in the eyepieces 220 are configured to redirect at least a portion of the IR light received at the eyepieces 220 towards the IR cameras 240, while allowing visible light to pass. The IR cameras 240, which may for example be located at or near an edge of the display 210, capture images of the user's eyes 292 from the infrared light redirected by the transmissive holographic layers 250.

The transmissive diffraction gratings 250 at or within the eyepieces 220 allow the camera 240 optical path to be redirected, resulting in a larger incident angle of the camera axis on the center pupil location (closer to 90 degrees) than in direct-view eye tracking camera architectures as shown in FIGS. 1A and 1B. The optical paths for the eye tracking cameras 240 of FIG. 2A thus provide a more direct view of the eyes 292 than the systems shown in FIGS. 1A and 1B via redirection by the diffraction gratings 250, while allowing spacing between the eyepieces 220 and the display 210 to be reduced when compared to the system shown in FIG. 1C.

FIG. 2B illustrates a VR/AR HMD 200 that implements an eye tracking system that includes transmissive diffraction gratings in the eyepieces and an optical prism or wedge to correct for total internal reflection (TIR), according to some embodiments. In some embodiments, the angle of curvature near the edge of the outer (display-facing) lens of the eyepiece 220 may result in TIR of IR light rays in that area. To compensate for the curvature, an optical prism or wedge 252 may be located at the edge of the outer surface of the lens to prevent TIR of the IR light rays in a region near the edge of the eyepiece 220 shown in FIG. 2B.

FIG. 3 illustrates a VR/AR HMD 300 that implements an eye tracking system that includes reflective diffraction gratings in the eyepieces, according to some embodiments. VR/AR HMD 300 may include, but is not limited to, a display 310 and two eyepieces 320, mounted in a wearable housing or frame. Each eyepiece 320 is an optical system that may include one or more optical lenses. The eye tracking system includes reflective diffraction gratings 360 in the eyepieces 320, and at least one eye tracking camera 340 (e.g., infrared (IR) cameras) located at the sides of the user's face (e.g., at or near the user's cheek bones). The user looks through the eyepieces 320 onto the display 310. The eyepieces 320 form a virtual image of the displayed content at a design distance which is typically close to optical infinity of the eyepieces 320. The eye tracking system may, for example, be used to track position and movement of the user's eyes 392. In some embodiments, the eye tracking system may instead or also be used to track dilation of the user's pupils, or other characteristics of the user's eyes 392. IR light source(s) 330 (e.g., IR LEDs) may be positioned in the HMD 300 (e.g., around the eyepieces 320, or elsewhere in the HMD 300) to illuminate the user's eyes 392 with IR light. In some embodiments, the display 310 emits light in the visible light range and does not emit light in the IR range, and thus does not introduce noise in the eye tracking system.

The reflective diffraction gratings 360 are positioned at or within the eyepieces 320. In some embodiments, a reflective diffraction grating 360 may be implemented as a holographic layer 360 sandwiched between two optical lenses of an eyepiece 320, or as a holographic layer attached to an object-side or image-side surface of an eyepiece 320. In some embodiments, the holographic layer 360 may be applied to a surface of one optical lens, and then the second optical lens may be attached to the holographic layer 360, for example using an optical coupling liquid. The surfaces of the lenses between which the holographic layer 360 is sandwiched may be, but are not necessarily, planar.

The light sources 330 of the HMD 300 emit IR light to illuminate the user's eyes 392. A portion of the IR light is reflected off the user's eyes 392 to the eye-facing surfaces of the eyepieces 320 of the HMD 300. The reflective holographic layers 360 integrated in the eyepieces 320 are configured to reflect at least a portion of the IR light received at the eyepieces 320 towards the IR cameras 340, while allowing visible light to pass. The IR cameras 340, which may for example be located at the sides of the user's face (e.g., at or near the user's cheek bones), capture images of the user's eyes 392 from the infrared light reflected by the reflective holographic layers 360.

The reflective diffraction gratings 360 at or within the eyepieces 320 allow the camera 340 optical path to be folded, resulting in a larger incident angle of the camera axis on the center pupil location (closer to 90 degrees) than in direct-view eye tracking camera architectures as shown in FIGS. 1A and 1B. The optical paths for the eye tracking cameras 340 of FIG. 3 thus provide a more direct view of the eyes 392 than the systems shown in FIGS. 1A and 1B via reflection off the diffraction gratings 360, while allowing spacing between the eyepieces 320 and the display 310 to be reduced when compared to the system shown in FIG. 1C.

Figure 4:
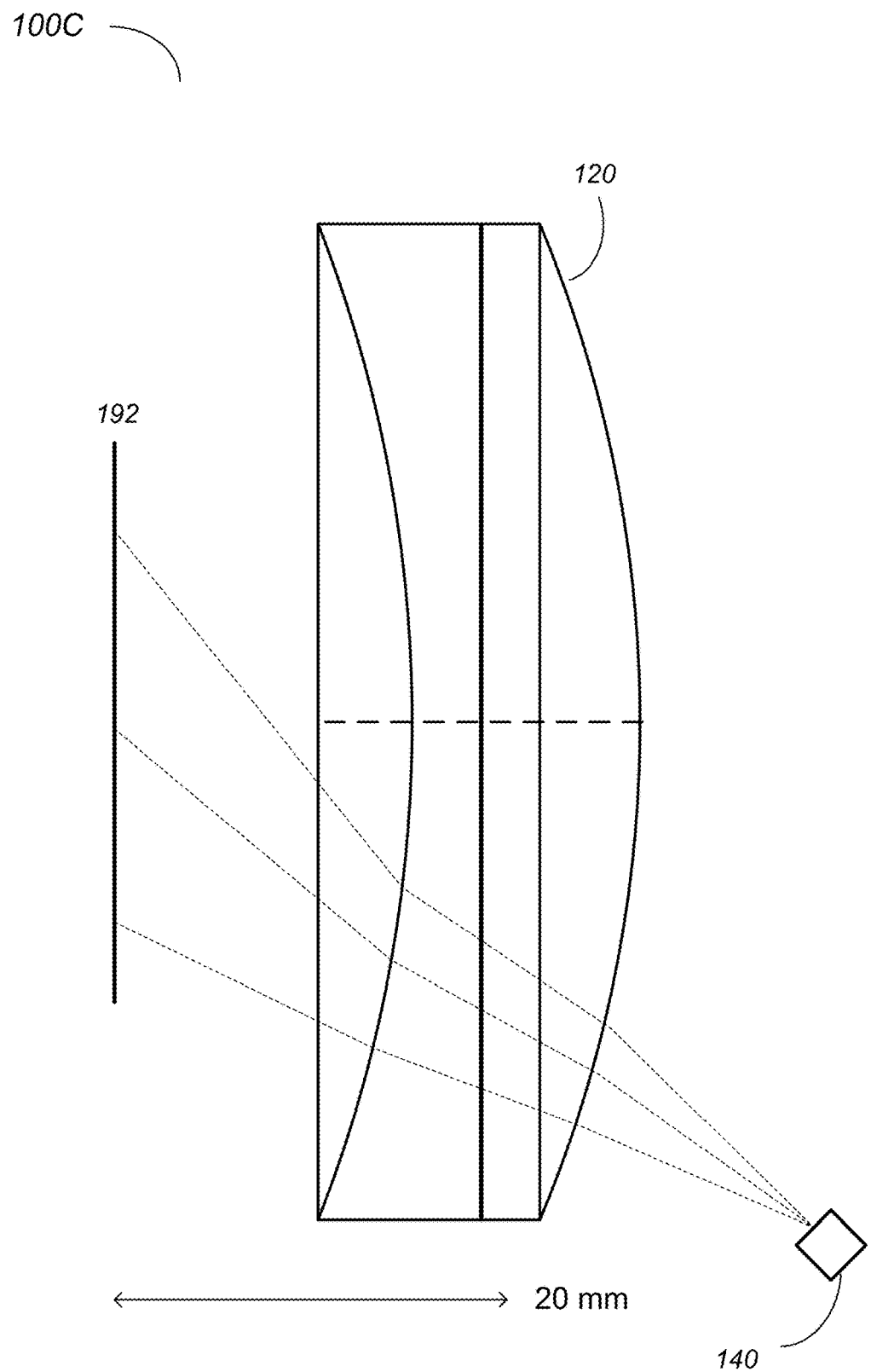
FIG. 4 illustrates an IR camera imaging a user's eye directly through an eyepiece.
Figure 6A:
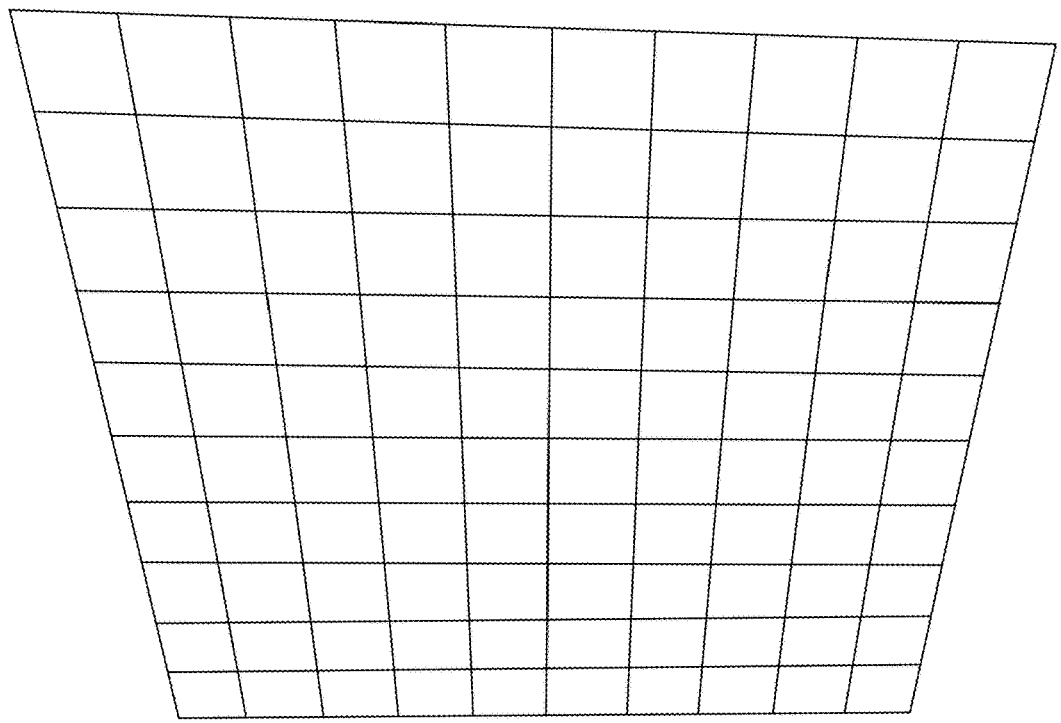
FIG. 6A illustrates distortion in a system as illustrated in FIG. 4.

FIG. 4 illustrates an IR camera 140 imaging a user's eye 192 directly through an eyepiece 120 as illustrated in FIG. 1B. The through-the-eyepiece view shown in FIG. 4 allows a more centered view of the eye 192 than the direct view of FIG. 1A, but has to deal with distortions in the eye images introduced by the eyepiece 120. In addition, while the through-the-eyepiece view shown in FIG. 4 improves the viewing angle somewhat when compared to the direct view of FIG. 1A, this configuration still suffers from reduced detection accuracy of eye features at extreme gaze angles. FIG. 6A illustrates distortion in a system as illustrated in FIG. 4.

Figure 5:
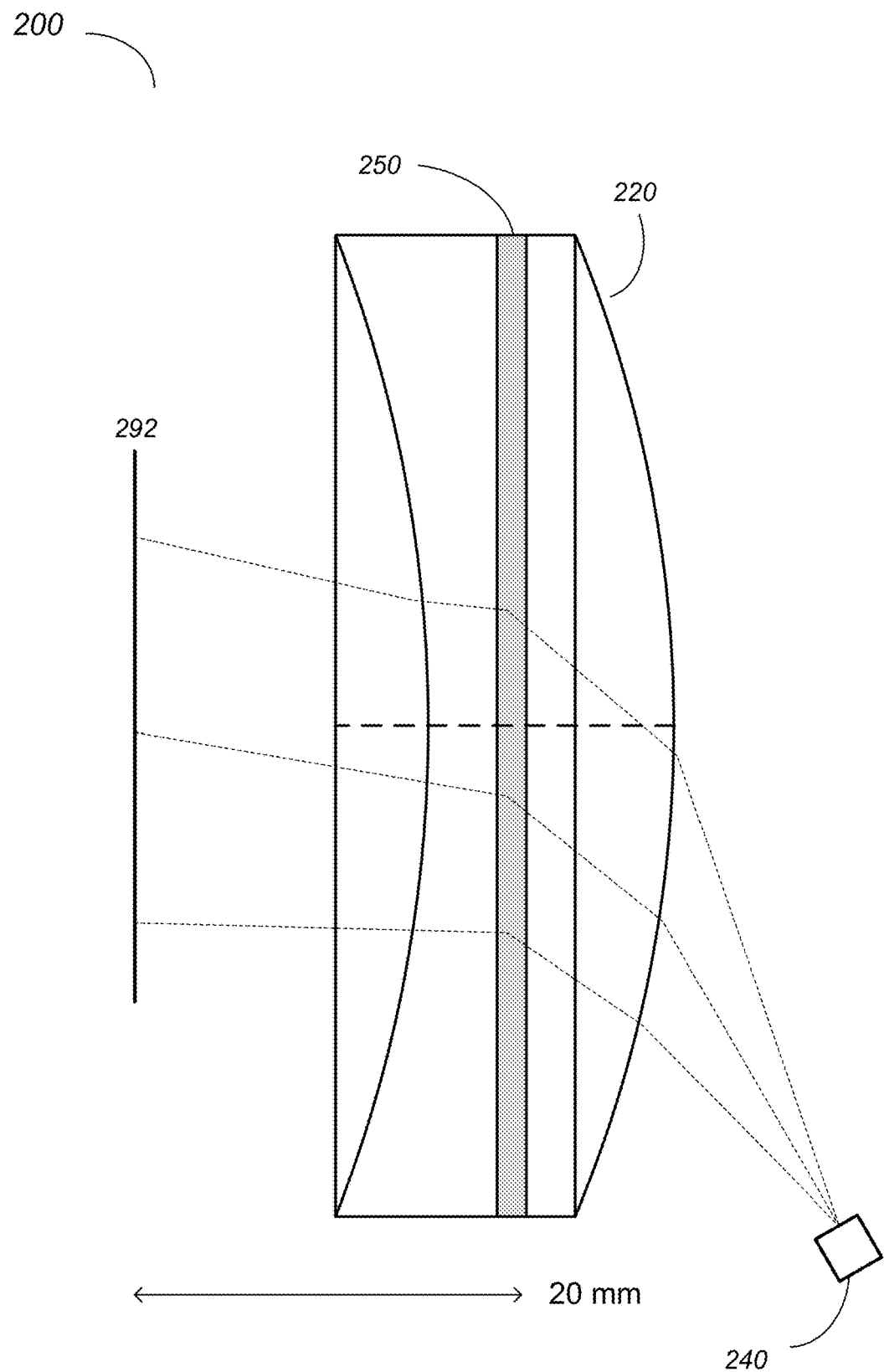
FIG. 5 illustrates an IR camera imaging a user's eye through an eyepiece that includes a transmissive diffraction grating, according to some embodiments.
Figure 6B:
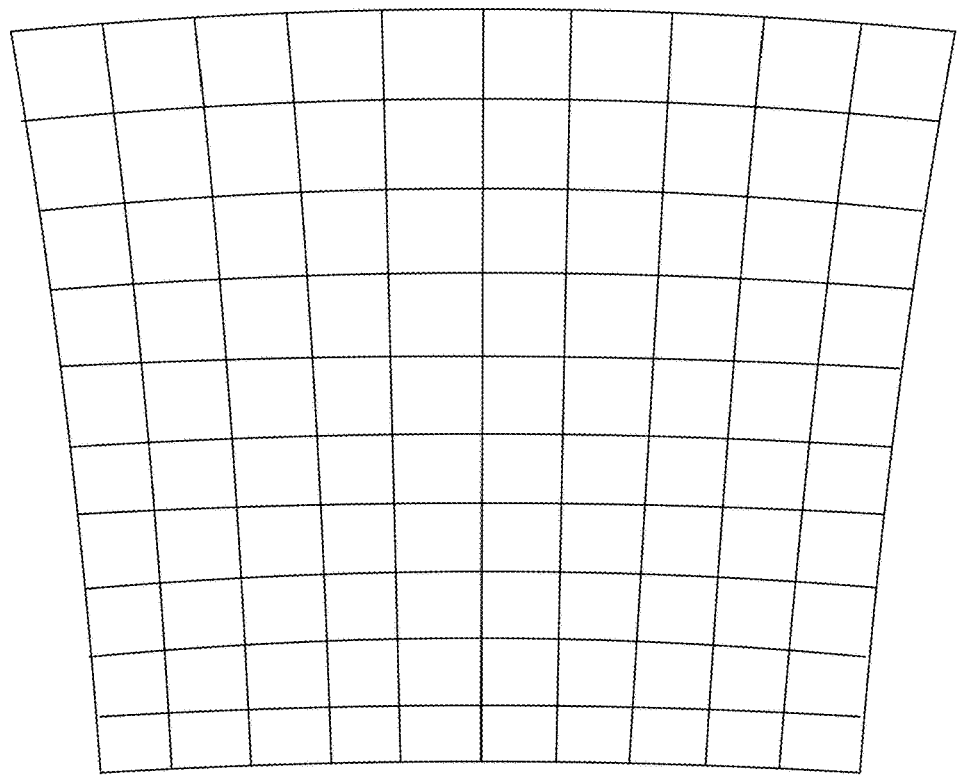
FIG. 6B illustrates reduced distortion in a system as illustrated in FIG. 5, according to some embodiments.

FIG. 5 illustrates an IR camera 240 imaging a user's eye 292 through an eyepiece 220 that includes a transmissive grating 250 as illustrated in FIG. 2A, according to some embodiments. Transmissive grating 250 redirects IR light rays reflected off the user's eye 292 at an oblique angle towards the IR camera 240. As can be seen in FIG. 5, integrating the transmissive grating 250 in the eyepiece 220 improves the viewing angle, and reduces distortion caused by the lenses of the IR camera 240 when compared to a system in which the IR camera 140 views the user's eye 192 directly through the eyepiece 120 as shown in FIG. 4, allowing the IR camera 240 to image the user's pupil even when turned away from the camera 240. FIG. 6B illustrates reduced distortion in a system as illustrated in FIG. 5 when compared to a system as illustrated in FIG. 4, according to some embodiments. Integrating the transmissive grating 250 in the eyepiece 220 also allows the spacing between the eyepiece 220 and the display panel (not shown) to be reduced when compared to systems as shown in FIG. 1C that include hot mirrors located between the eyepiece and the display panel that reflect IR light towards the IR cameras.

Figure 7:
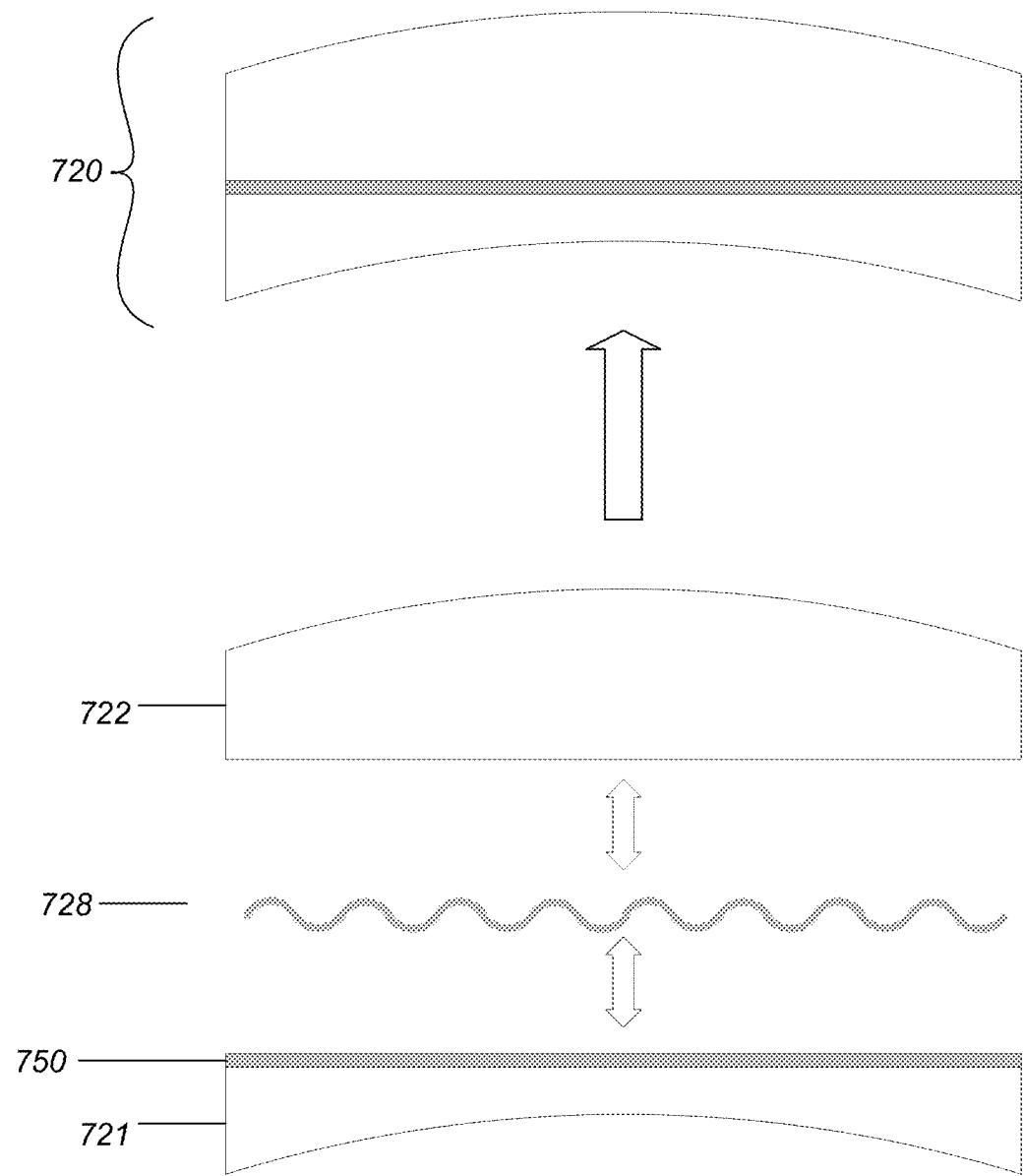
FIG. 7 illustrates an example assembly process for an eyepiece with an integrated diffraction grating, according to some embodiments.

FIG. 7 illustrates an example assembly process for an eyepiece 720 with an integrated diffraction 750, according to some embodiments. A diffraction grating 750 (e.g., a holographic film) is applied to a surface of an optical lens 721. The diffraction grating 750 is then recorded with transmissive or reflective holograms using a holographic recording technology. A second optical lens 722 is attached to the diffraction grating 750, for example using an optical coupling liquid 728, to produce eyepiece 720. The surfaces of the lenses 721 and 722 between which the diffraction grating 750 is sandwiched may be planar, and thus the diffraction grating is planar, as shown in FIG. 7. However, in some embodiments, the surfaces of the lenses 721 and 722 between which the diffraction grating 750 is sandwiched may be curved, and the diffraction grating 750 may thus also be curved to conform to the surfaces. Note that the shape and number of optical lenses shown in eyepiece 720 are given as an example, and are not intended to be limiting. Other shapes of optical lenses may be used, and in some embodiments one or more additional optical lenses may be attached to the optical lenses between which the holographic layer 750 is sandwiched. In some embodiments, a holographic layer or film may be laminated to an image side (eye-facing) or object side (display-facing) surface of an eyepiece that includes two or more optical lenses. In some embodiments, an eyepiece may include only one optical lens, and a holographic layer or film may be laminated to an image side (eye-facing) or object side (display-facing) surface of the optical lens. As mentioned, in some embodiments, diffraction grating 750 may be a holographic film. However, other types of diffraction gratings may be used in some embodiments. For example, in some embodiments, a photothermal reflective glass may be used as the diffraction grating. In other embodiments, a surface relief grating with mismatched index of refraction at the eye tracking wavelength may be used as the diffraction grating.

Figure 8:
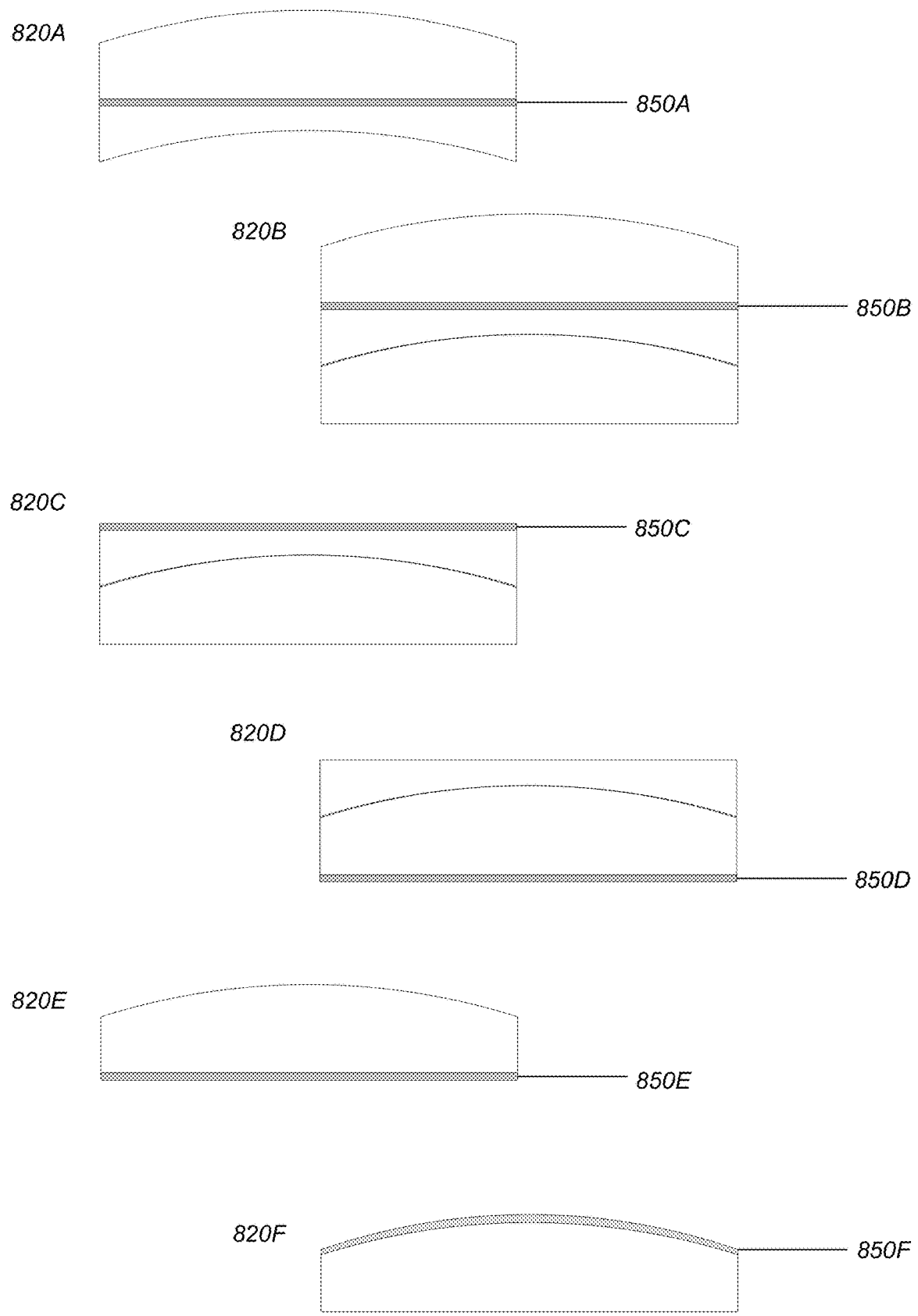
FIG. 8 illustrates example eyepieces that include diffraction gratings at different locations in the eyepiece, according to some embodiments.

FIG. 8 illustrates example eyepieces that include diffraction gratings at different locations in the eyepiece, according to some embodiments. Note that the shape and number of optical lenses shown in the eyepieces 850 are given as an example, and are not intended to be limiting. Eyepiece 820A includes two optical lenses, with a diffraction grating 850A located between the two lenses. Eyepiece 850B includes three optical lenses, with a diffraction grating 850B located between two of the lenses. Eyepiece 850C includes two optical lenses, with a diffraction grating 850C located at the object side surface of the eyepiece 850C. Eyepiece 850D includes two optical lenses, with a diffraction grating 850D located at the image side surface of the eyepiece 850C. Eyepiece 850E includes a single optical lens, with a diffraction grating 850E located at the image side surface of the eyepiece 850E. Eyepiece 850F includes a single optical lens, with a diffraction grating 850F located at the image side surface of the eyepiece 850F. Eyepiece 850F also illustrates a diffraction grating 850F applied to a curved surface of a lens.

Figure 9:
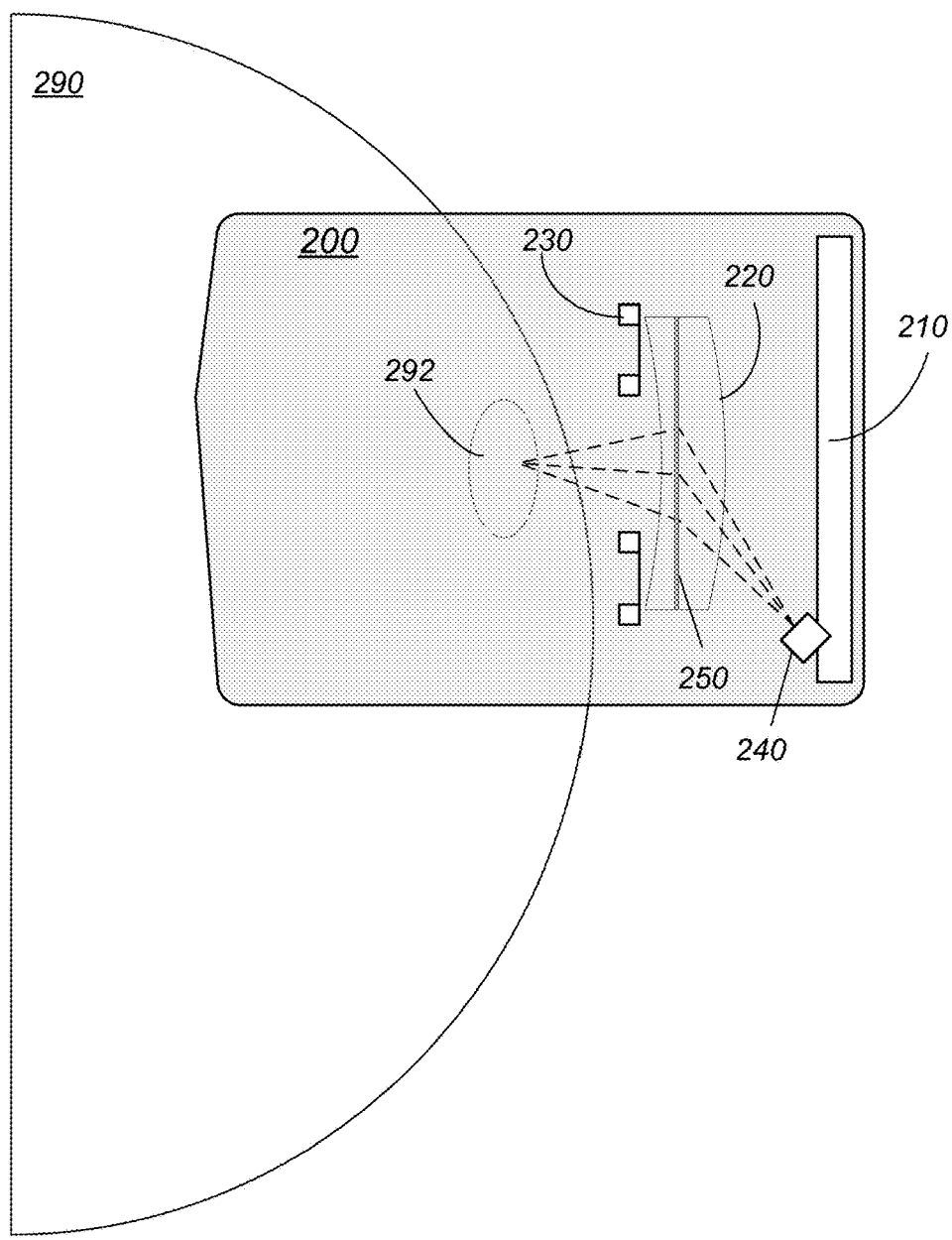
FIG. 9 shows a side view of an example HMD that implements an eye tracking system as illustrated in FIG. 2A or 2B, according to some embodiments.

FIG. 9 shows a side view of an example HMD 200 that implements an eye tracking system as illustrated in FIG. 2A or 2B, according to some embodiments. Note that HMD 200 as illustrated in FIG. 9 is given by way of example, and is not intended to be limiting. In various embodiments, the shape, size, and other features of an HMD 200 may differ, and the locations, numbers, types, and other features of the components of an HMD 200 may vary. The eye tracking system may, for example, be used to track position and movement of the user 290's eyes 292. In some embodiments, the eye tracking system may instead or also be used to track dilation of the user 290's pupils, or other characteristics of the user 290's eyes 292. Information collected by the eye tracking system may be used in various VR or AR system functions. For example, the point of gaze on the display 210 may be estimated from images captured by the eye tracking system; the estimated point of gaze may, for example, enable gaze-based interaction with content shown on the near-eye display 210. Other applications of the eye tracking information may include, but are not limited to, creation of eye image animations used for avatars in a VR or AR environment. As another example, in some embodiments, the information collected by the eye tracking system may be used to adjust the rendering of images to be projected, and/or to adjust the projection of the images by the projection system of the HMD 200, based on the direction and angle at which the user 290's eyes are looking.

As another example, in some embodiments, brightness of the projected images may be modulated based on the user 290's pupil dilation as determined by the eye tracking system.

As shown in FIG. 9, HMD 200 may be positioned on the user 290's head such that the display 210 and eyepieces 220 are disposed in front of the user 290's eyes 292. One or more IR light source(s) 230 (e.g., IR LEDs) may be positioned in the HMD 200 (e.g., around the eyepieces 220, or elsewhere in the HMD 200) to illuminate the user 290's eyes 292 with IR light. In some embodiments, the IR light source(s) 230 may emit light at different IR wavelengths (e.g., 850 nm and 940 nm).

Each eyepiece 220 is an optical system that may include one or more optical lenses. The eye tracking system includes transmissive diffraction gratings 250 in the eyepieces 220, and at least one eye tracking camera 240 (e.g., an infrared (IR) cameras, for example a 400×400 pixel count camera that operates at 850 nm or 940 nm, or at some other IR wavelength) located at or near an edge of the display 210 (e.g., at the top, bottom, left, and/or right side of the display 210). The user looks through the eyepieces 220 onto the display 210. The eyepieces 220 form a virtual image of the displayed content at a design distance which is typically close to optical infinity of the eyepieces 220. Note that the location and angle of eye tracking camera 240 is given by way of example, and is not intended to be limiting. While FIG. 9 shows a single eye tracking camera 240 for each eye 292, in some embodiments there may be two or more IR cameras 240 for each eye 292. For example, in some embodiments, a camera 240 with a wider field of view (FOV) and a camera 240 with a narrower FOV may be used for each eye 292. As another example, in some embodiments, a camera 240 that operates at one wavelength (e.g. 850 nm) and a camera 240 that operates at a different wavelength (e.g. 940 nm) may be used for each eye 292. A portion of IR light emitted by light source(s) 230 reflects off the user 290's eyes 292, is redirected by transmissive diffraction gratings 250 to the cameras 240, and is captured by the cameras 242 to image the user's eyes 292.

Embodiments of the HMD 200 with an eye tracking system as illustrated in FIG. 9 may, for example, be used in augmented or mixed (AR) applications to provide augmented or mixed reality views to the user 290. While not shown, in some embodiments, HMD 200 may include one or more sensors, for example located on external surfaces of the HMD 200, that collect information about the user 290's external environment (video, depth information, lighting information, etc.); the sensors may provide the collected information to a controller (not shown) of the VR/AR system. In some embodiments, the sensors may include one or more visible light cameras (e.g., RGB video cameras) that capture video of the user's environment that may be used to provide the user 290 with a virtual view of their real environment. In some embodiments, video streams of the real environment captured by the visible light cameras may be processed by a controller of the HMD 200 to render augmented or mixed reality frames that include virtual content overlaid on the view of the real environment, and the rendered frames may be provided to the projection system of the HMD 200 for display on display 210.

Embodiments of the HMD 200 with an eye tracking system as illustrated in FIG. 9 may also be used in virtual reality (VR) applications to provide VR views to the user 290. In these embodiments, a controller of the HMD 200 may render or obtain virtual reality (VR) frames that include virtual content, and the rendered frames may be provided to the projection system of the HMD 200 for display on display 210.

Figure 11:
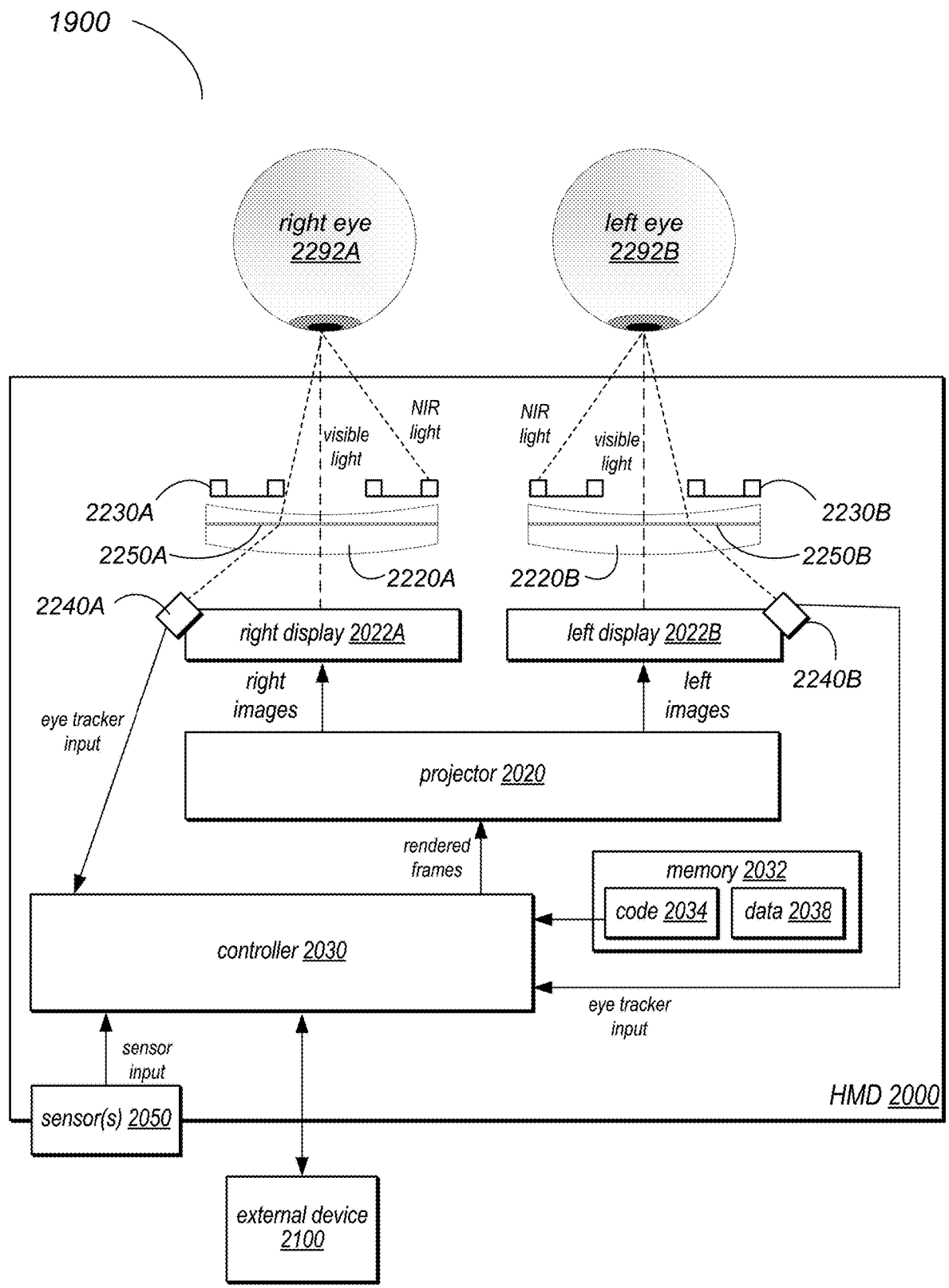
FIG. 11 is a block diagram illustrating components of an example VR/AR system that includes an eye tracking system as illustrated in FIG. 2A, 2B, or 3, according to some embodiments.

A controller may be implemented in the HMD 200, or alternatively may be implemented at least in part by an external device (e.g., a computing system) that is communicatively coupled to HMD 200 via a wired or wireless interface. The controller may include one or more of various types of processors, image signal processors (ISPs), graphics processing units (GPUs), coder/decoders (codecs), and/or other components for processing and rendering video and/or images. The controller may render frames (each frame including a left and right image) that include virtual content based at least in part on the inputs obtained from the sensors, and may provide the frames to a projection system of the HMD 200 for display to display 210. FIG. 11 further illustrates components of a HMD and VR/AR system, according to some embodiments.

Figure 10:
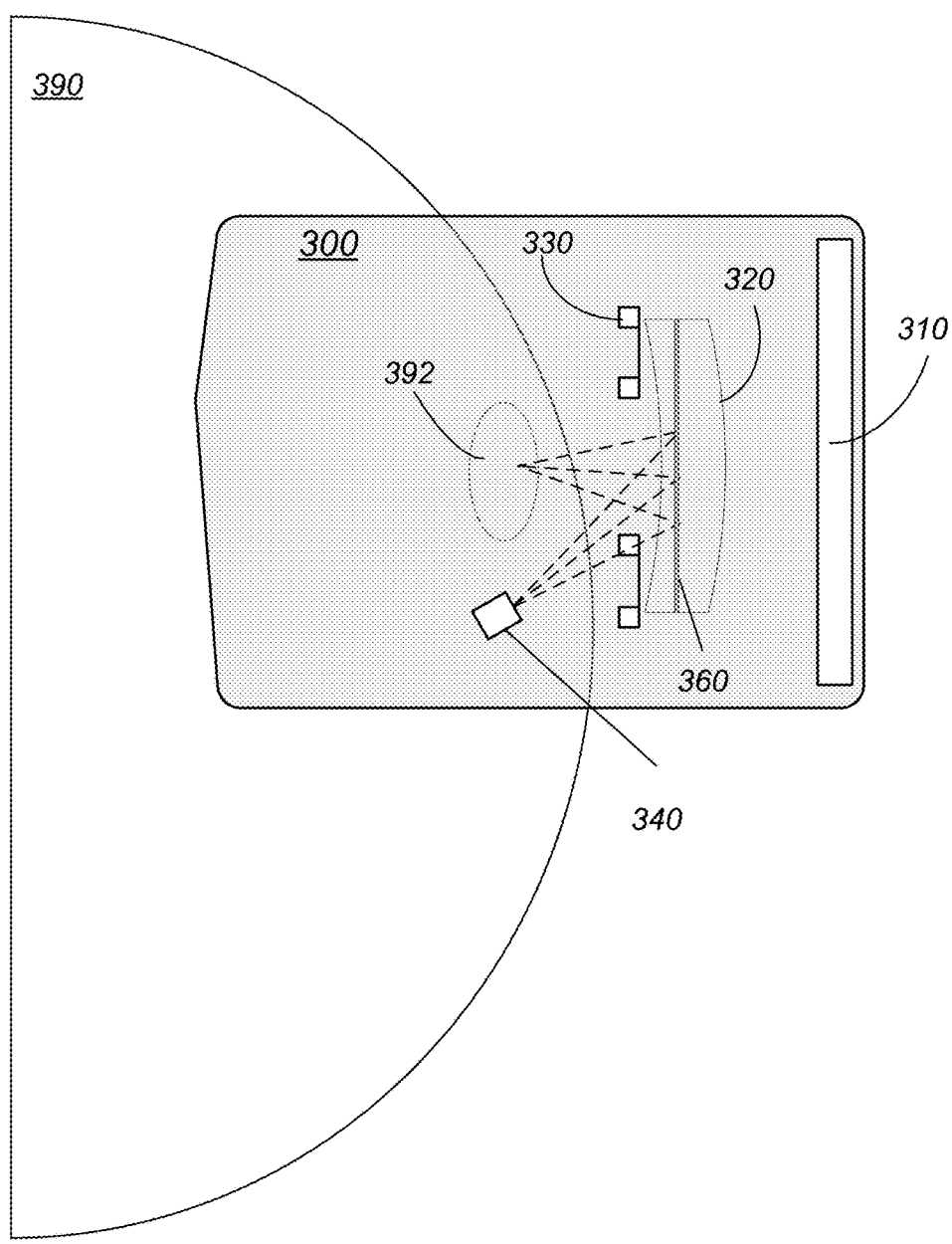
FIG. 10 shows a side view of an example HMD that implements an eye tracking system as illustrated in FIG. 3, according to some embodiments.

FIG. 10 shows a side view of an example HMD 300 that implements an eye tracking system as illustrated in FIG. 3, according to some embodiments. Note that HMD 300 as illustrated in FIG. 10 is given by way of example, and is not intended to be limiting. In various embodiments, the shape, size, and other features of an HMD 300 may differ, and the locations, numbers, types, and other features of the components of an HMD 300 may vary. The eye tracking system may, for example, be used to track position and movement of the user 390's eyes 392. In some embodiments, the eye tracking system may instead or also be used to track dilation of the user 390's pupils, or other characteristics of the user 390's eyes 392. Information collected by the eye tracking system may be used in various VR or AR system functions. For example, the point of gaze on the display 310 may be estimated from images captured by the eye tracking system; the estimated point of gaze may, for example, enable gaze-based interaction with content shown on the near-eye display 310. Other applications of the eye tracking information may include, but are not limited to, creation of eye image animations used for avatars in a VR or AR environment. As another example, in some embodiments, the information collected by the eye tracking system may be used to adjust the rendering of images to be projected, and/or to adjust the projection of the images by the projection system of the HMD 300, based on the direction and angle at which the user 390's eyes are looking. As another example, in some embodiments, brightness of the projected images may be modulated based on the user 390's pupil dilation as determined by the eye tracking system.

As shown in FIG. 10, HMD 300 may be positioned on the user 390's head such that the display 310 and eyepieces 320 are disposed in front of the user 390's eyes 392. One or more IR light source(s) 330 (e.g., IR LEDs) may be positioned in the HMD 300 (e.g., around the eyepieces 320, or elsewhere in the HMD 300) to illuminate the user 390's eyes 392 with IR light. In some embodiments, the IR light source(s) 330 may emit light at different IR wavelengths (e.g., 850 nm and 940 nm).

Each eyepiece 320 is an optical system that may include one or more optical lenses. The eye tracking system includes reflective diffraction gratings 360 in the eyepieces 320, and at least one eye tracking camera 340 (e.g., an infrared (IR) cameras, for example a 400×400 pixel count camera that operates at 850 nm or 940 nm, or at some other IR wavelength) located at the sides of the user's face (e.g., at or near the user's cheek bones). The user looks through the eyepieces 320 onto the display 310. The eyepieces 320 form a virtual image of the displayed content at a design distance which is typically close to optical infinity of the eyepieces 320. Note that the location and angle of eye tracking camera 340 is given by way of example, and is not intended to be limiting. While FIG. 10 shows a single eye tracking camera 340 for each eye 392, in some embodiments there may be two or more IR cameras 340 for each eye 392. For example, in some embodiments, a camera 340 with a wider field of view (FOV) and a camera 340 with a narrower FOV may be used for each eye 392. As another example, in some embodiments, a camera 340 that operates at one wavelength (e.g. 850 nm) and a camera 340 that operates at a different wavelength (e.g. 940 nm) may be used for each eye 392. A portion of IR light emitted by light source(s) 330 reflects off the user 390's eyes 392, is reflected by reflective diffraction gratings 360 to the cameras 340, and is captured by the cameras 342 to image the user's eyes 392.

Embodiments of the HMD 300 with an eye tracking system as illustrated in FIG. 10 may, for example, be used in augmented or mixed (AR) applications to provide augmented or mixed reality views to the user 390. While not shown, in some embodiments, HMD 300 may include one or more sensors, for example located on external surfaces of the HMD 300, that collect information about the user 390's external environment (video, depth information, lighting information, etc.); the sensors may provide the collected information to a controller (not shown) of the VR/AR system. In some embodiments, the sensors may include one or more visible light cameras (e.g., RGB video cameras) that capture video of the user's environment that may be used to provide the user 390 with a virtual view of their real environment. In some embodiments, video streams of the real environment captured by the visible light cameras may be processed by a controller of the HMD 300 to render augmented or mixed reality frames that include virtual content overlaid on the view of the real environment, and the rendered frames may be provided to the projection system of the HMD 300 for display on display 310.

Embodiments of the HMD 300 with an eye tracking system as illustrated in FIG. 10 may also be used in virtual reality (VR) applications to provide VR views to the user 390. In these embodiments, a controller of the HMD 300 may render or obtain virtual reality (VR) frames that include virtual content, and the rendered frames may be provided to the projection system of the HMD 300 for display on display 310.

A controller may be implemented in the HMD 300, or alternatively may be implemented at least in part by an external device (e.g., a computing system) that is communicatively coupled to HMD 300 via a wired or wireless interface. The controller may include one or more of various types of processors, image signal processors (ISPs), graphics processing units (GPUs), coder/decoders (codecs), and/or other components for processing and rendering video and/or images. The controller may render frames (each frame including a left and right image) that include virtual content based at least in part on the inputs obtained from the sensors, and may provide the frames to a projection system of the HMD 300 for display to display 310. FIG. 11 further illustrates components of a HMD and VR/AR system, according to some embodiments.

FIG. 11 is a block diagram illustrating components of an example VR/AR system 1900 that includes an eye tracking system as illustrated in FIG. 2A, 2B, or 3, according to some embodiments. In some embodiments, a VR/AR system 1900 may include an HMD 2000 such as a headset, helmet, goggles, or glasses. HMD 2000 may implement any of various types of virtual reality projector technologies. For example, the HMD 2000 may include a VR projection system that includes a projector 2020 that displays frames including left and right images on screens or displays 2022A and 2022B that are viewed by a user through eyepieces 2220A and 2220B. The VR projection system may, for example, be a DLP (digital light processing), LCD (liquid crystal display), or LCoS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 configured to implement functionality of the VR/AR system 1900 and to generate frames (each frame including a left and right image) that are displayed by the projector 2020. In some embodiments, HMD 2000 may also include a memory 2032 configured to store software (code 2034) of the VR/AR system that is executable by the controller 2030, as well as data 2038 that may be used by the VR/AR system 1900 when executing on the controller 2030. In some embodiments, HMD 2000 may also include one or more interfaces (e.g., a Bluetooth technology interface, USB interface, etc.) configured to communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAIVIBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors 2050 that collect information about the user's environment (video, depth information, lighting information, etc.). The sensors 2050 may provide the information to the controller 2030 of the VR/AR system 1900. In some embodiments, sensors 2050 may include, but are not limited to, visible light cameras (e.g., video cameras).

As shown in FIGS. 9 and 10, HMD 2000 may be positioned on the user's head such that the displays 2022A and 2022B and eyepieces 2220A and 2220B are disposed in front of the user's eyes 2292A and 2292B. IR light sources 2230A and 2230B (e.g., IR LEDs) may be positioned in the HMD 2000 (e.g., around the eyepieces 2220A and 2220B, or elsewhere in the HMD 2000) to illuminate the user's eyes 2292A and 2292B with IR light. Diffraction gratings 2242A and 2242B are located at or within the eyepieces 2220A and 2220B. FIG. 11 shows transmissive diffraction gratings as illustrated in FIGS. 2A, 2B, and 9; however, reflective diffraction gratings as shown in FIGS. 3 and 10 may be used in some embodiments. Eye tracking cameras 2240A and 2240B (e.g., IR cameras, for example 400×400 pixel count cameras) are located at or near edges of displays 2022A and 2022B, respectively. In embodiments in which reflective diffraction gratings are used, the eye tracking cameras may instead be located at each side of the user's face, for example at or near the user's cheek bones as shown in FIG. 10. Note that the location of eye tracking cameras 2240A and 2240B is given by way of example, and is not intended to be limiting. In some embodiments, there may be a single eye tracking camera 2240 for each eye 2292. In some embodiments there may be two or more IR cameras 2240 for each eye 2292. For example, in some embodiments, a wide-angle camera 2240 and a narrower-angle camera 2240 may be used for each eye 2292. A portion of IR light emitted by light sources 2230A and 2230B reflects off the user's eyes 2292A and 2292B, is redirected (or reflected) by diffraction gratings 2242A and 2242B to respective eye tracking cameras 2240A and 2240B, and is captured by the eye tracking cameras 2240A and 2240B to image the user's eyes 2292A and 2292B. Eye tracking information captured by the cameras 2240A and 2240B may be provided to the controller 2030. The controller 2030 may analyze the eye tracking information (e.g., images of the user's eyes 2292A and 2292B) to determine eye position and movement, pupil dilation, or other characteristics of the eyes 2292A and 2292B.

The eye tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B; the estimated point of gaze may, for example, enable gaze-based interaction with content shown on the displays 2022A and 2022B. Other applications of the eye tracking information may include, but are not limited to, creation of eye image animations used for avatars in a VR or AR environment. As another example, in some embodiments, the information obtained from the eye tracking cameras 2240A and 2240B may be used to adjust the rendering of images to be projected, and/or to adjust the projection of the images by the projector 2020 of the HMD 2000, based on the direction and angle at which the user's eyes are looking. As another example, in some embodiments, brightness of the projected images may be modulated based on the user's pupil dilation as determined by the eye tracking system.

In some embodiments, the HMD 2000 may be configured to render and display frames to provide an augmented or mixed reality (AR) view for the user at least in part according to sensor 2050 inputs. The AR view may include renderings of the user's environment, including renderings of real objects in the user's environment, based on video captured by one or more video cameras that capture high-quality, high-resolution video of the user's environment for display. The AR view may also include virtual content (e.g., virtual objects, virtual tags for real objects, avatars of the user, etc.) generated by VR/AR system 1900 and composited with the projected view of the user's real environment.

Embodiments of the HMD 2000 as illustrated in FIG. 11 may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B.

Figure 12:
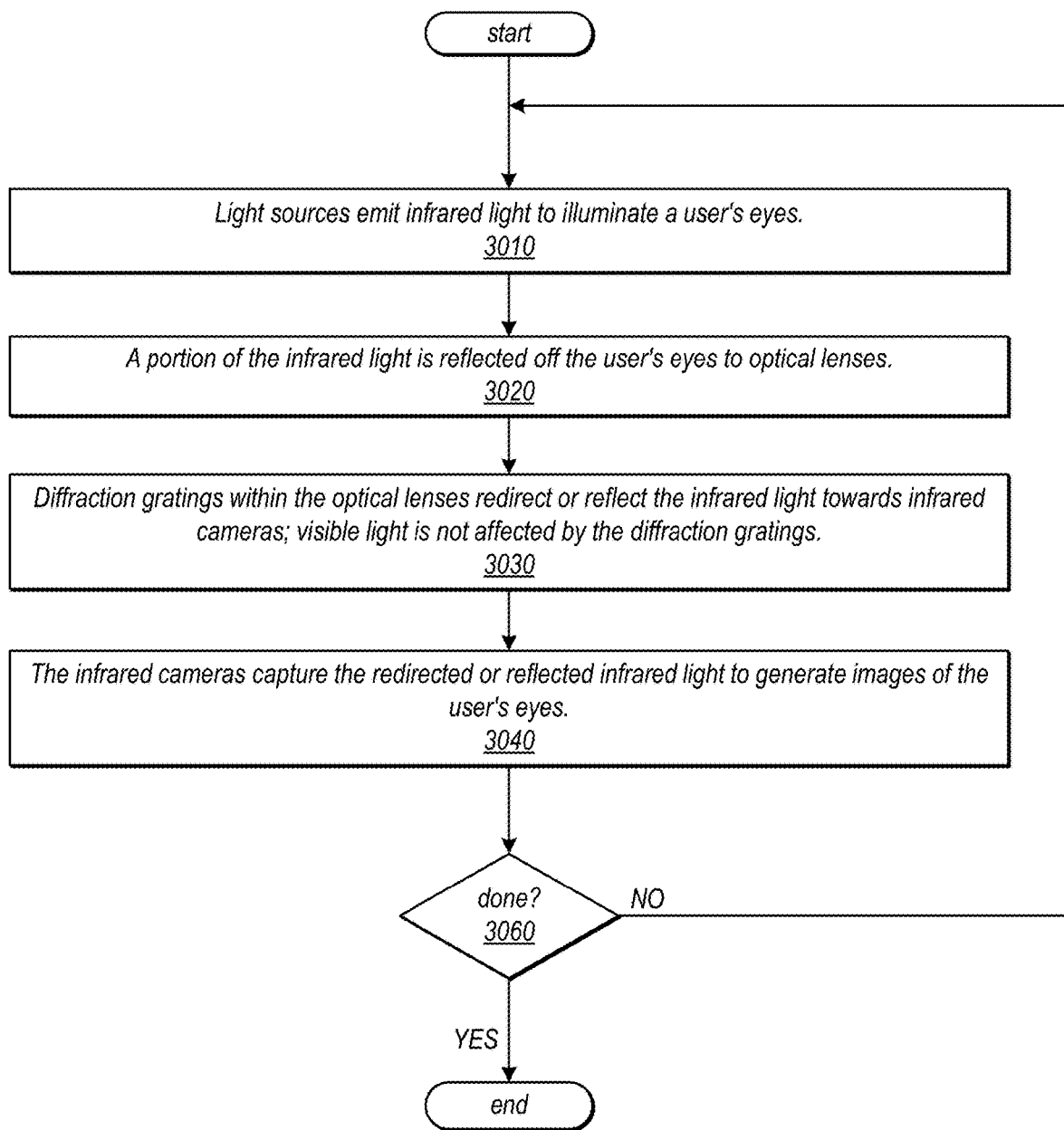
FIG. 12 is a high-level flowchart illustrating a method of operation of an HMD that includes an eye tracking system as illustrated in FIG. 2A, 2B, or 3, according to some embodiments.

FIG. 12 is a high-level flowchart illustrating a method of operation of an HMD that includes an eye tracking system as illustrated in FIG. 2A, 2B, or 3, according to some embodiments. As indicated at 3010, light sources of the HMD emit infrared (IR) light to illuminate a user's eyes. As indicated at 3020, a portion of the IR light is reflected off the user's eyes to diffraction gratings located at or within the eyepieces of the HMD. For example, a diffraction grating may be implemented as a holographic layer located between two optical lenses of an eyepiece, or at an object-side or image-side surface of an eyepiece. As indicated at 3030, the diffraction gratings redirect (transmissive diffraction gratings) or reflect (reflective diffraction gratings) at least a portion of the IR light towards IR cameras, while allowing visible light to pass. As indicated at 3040, the IR cameras, located at or near edges of the display when using transmissive diffraction gratings or located at the sides of the user's face (e.g., at or near the user's cheek bones) when using reflective diffraction gratings, capture images of the user's eyes from the IR light redirected or reflected by the diffraction gratings. The arrow returning from element 3060 to element 3010 indicates that the eye tracking process may be a continuous process as long as the user is using the HMD.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a head-mounted display (HMD) configured to display visual content for viewing by a user, wherein the HMD comprises:
left and right optical elements located in front of the user's left and right eyes;
one or more infrared light sources configured to emit infrared light towards the user's eyes;
left and right infrared cameras;
left and right diffraction gratings integrated within the left and right optical elements, wherein the left and right diffraction gratings are configured to diffract infrared light returned from the user's eyes towards the left and right infrared cameras, respectively; and
wherein the left and right infrared cameras are configured to capture a portion of the infrared light diffracted by the left and right diffraction gratings to generate images of the user's eyes.

2. The system as recited in claim 1, wherein the left and right diffraction gratings are transmissive diffraction gratings configured to redirect infrared light returned from the user's eyes towards the left and right infrared cameras.

3. The system as recited in claim 1, wherein the left and right diffraction gratings are reflective diffraction gratings configured to reflect infrared light returned from the user's eyes towards the left and right infrared cameras.

4. The system as recited in claim 1, wherein the left and right infrared cameras include at least one camera that images the user's left eye and at least one camera that images the user's right eye.

5. The system as recited in claim 1, wherein the diffraction gratings are implemented as a holographic film.

6. The system as recited in claim 1, wherein the diffraction gratings are implemented as photothermal reflective glass or as a surface relief grating with mismatched index of refraction at an eye tracking wavelength.

7. The system as recited in claim 1, further comprising a controller comprising one or more processors, wherein the controller is configured to:
obtain the images of the user's eyes from the left and right infrared cameras; and
analyze the images of the user's eyes to determine eye tracking information.

8. The system as recited in claim 7, wherein the eye tracking information includes one or more of eye position, eye movement, or pupil dilation.

9. The system as recited in claim 1, further comprising one or more visible light cameras configured to capture views of the user's environment, wherein the visual content includes virtual content composited into the views of the user's environment to provide an augmented or mixed reality view to the user.

10. The system as recited in claim 1, wherein the visual content includes virtual content to provide a virtual reality view to the user.

11. The system as recited in claim 1, further comprising optical prisms or wedges located at edges of outer surfaces of the left and right optical elements to prevent total internal reflection (TIR) of infrared light rays diffracted by the left and right diffraction gratings in a region near the edges of the optical elements.

12. A method, comprising:
emitting, by one or more light sources of a head-mounted display (HMD), infrared (IR) light to illuminate a user's eyes;
receiving, at diffraction gratings located on a surface of or inside optical elements of the HMD, a portion of the IR light reflected off the user's eyes;
diffracting, by the diffraction gratings, at least a portion of the received IR light towards IR cameras of the HMD; and
capturing, by the IR cameras of the HMD, images of the user's eyes from the IR light diffracted by the diffraction gratings.

13. The method as recited in claim 12, wherein the diffraction gratings are transmissive diffraction gratings, and wherein diffracting the IR light towards the IR cameras comprises redirecting the IR light towards the infrared cameras.

14. The method as recited in claim 12, wherein the diffraction gratings are reflective diffraction gratings, and wherein diffracting the IR light towards the IR cameras comprises reflecting the IR light towards the infrared cameras.

15. The method as recited in claim 12, wherein the optical elements each include one or more optical lenses, wherein the diffraction gratings are implemented as one of a holographic film applied to a surface of one of the one or more optical lenses, a photothermal reflective glass attached to a surface of one of the one or more optical lenses, or a surface relief grating on one of the one or more optical lenses with mismatched index of refraction at the eye tracking wavelength.

16. The method as recited in claim 12, wherein the optical elements include optical prisms or wedges located at edges of outer surfaces of the optical elements to prevent total internal reflection (TIR) of infrared light rays diffracted by the diffraction gratings in a region near the edges of the optical elements.

17. A device, comprising:
a display configured to display visual content for viewing by a user;
an infrared light source configured to emit infrared light towards the user's eye;
a camera; and
a transmissive diffraction grating located on an optical path between the user's eye and the display and configured to redirect the infrared light reflected from the user's eye in a direction of the camera as the infrared light passes through the transmissive diffraction grating;
wherein the camera is configured to capture a portion of the infrared light redirected by the transmissive diffraction grating to generate images of the user's eye as illuminated by the infrared light source.

18. The device as recited in claim 17, wherein the optical element includes an optical prism or wedge located at an edge of an outer surface of the optical element to prevent total internal reflection (TIR) of the infrared light rays redirected by the transmissive diffraction gratings in a region near the edge of the optical element.

19. The device as recited in claim 17, wherein the transmissive diffraction grating is one of a holographic film applied to a surface of an optical lens, a photothermal reflective glass attached to a surface of an optical lens, or a surface relief grating on an optical lens with mismatched index of refraction at the eye tracking wavelength.

\* \* \* \* \*